United States Patent
Novales De La Pena et al.

(10) Patent No.: US 12,454,897 B2
(45) Date of Patent: Oct. 28, 2025

(54) SUPERCRITICAL CARBON DIOXIDE REGENERATIVE BRAYTON CYCLE WITH MULTIPLE RECUPERATORS AND AUXILIARY COMPRESSORS

(71) Applicant: Universidad Del Pais Vasco / Euskal Herriko Unibertsitatea, Leioa (ES)

(72) Inventors: David Novales De La Pena, Leioa (ES); Aitor Ercoreca Gonzalez, Leioa (ES); Ivan Flores Abascal, Leioa (ES)

(73) Assignee: Universidad Del Pais Vasco / Euskal Herriko Unibertsitatea, Leioa (ES)

( * ) Notice: Subject to any disclaimer, the term of this patent is extended or adjusted under 35 U.S.C. 154(b) by 0 days.

(21) Appl. No.: 18/708,913

(22) PCT Filed: Nov. 11, 2022

(86) PCT No.: PCT/EP2022/081641
§ 371 (c)(1),
(2) Date: May 9, 2024

(87) PCT Pub. No.: WO2023/084035
PCT Pub. Date: May 19, 2023

(65) Prior Publication Data
US 2025/0297559 A1    Sep. 25, 2025

(30) Foreign Application Priority Data
Nov. 12, 2021   (ES) .............................. ES202131058

(51) Int. Cl.
*F01K 25/10*    (2006.01)
*F02C 1/10*    (2006.01)
(Continued)

(52) U.S. Cl.
CPC .............. *F01K 25/103* (2013.01); *F02C 1/10* (2013.01); *F02C 7/10* (2013.01); *F22B 3/08* (2013.01)

(58) Field of Classification Search
CPC .. F01K 25/103; F02C 1/10; F02C 7/10; F22B 3/08
(Continued)

(56) References Cited
U.S. PATENT DOCUMENTS

| | | | |
|---|---|---|---|
| 2012/0131920 A1* | 5/2012 | Held | F01K 25/10 60/682 |
| 2015/0260463 A1* | 9/2015 | Laughlin | F24S 60/10 165/104.31 |

(Continued)

FOREIGN PATENT DOCUMENTS

| | | |
|---|---|---|
| WO | 2016007509 A1 | 1/2016 |
| WO | 2020065496 A1 | 4/2020 |

OTHER PUBLICATIONS

Novales, D., et al., "Sensitivity analysis of supercritical CO2 power cycle energy and exergy efficiencies regarding cycle component efficiencies for concentrating solar power," Energy Conversion and Management 182 (2019) 430-450, Elsevier.com, 21 pages.
(Continued)

*Primary Examiner* — Hoang M Nguyen
(74) *Attorney, Agent, or Firm* — Wood Herron & Evans LLP

(57) ABSTRACT

Method for producing energy by means of a supercritical carbon dioxide (sCO2) regenerative Brayton cycle with N recuperators in series and N or N−1 auxiliary compressors, where N≥3. By using a higher number of recuperators in series and an auxiliary compressor for each recuperator, the heat recovery process is improved and thus the performance of the cycle compared to the cycles of the state-of-the-art.

1 Claim, 13 Drawing Sheets

(51) Int. Cl.
 *F02C 7/10* (2006.01)
 *F22B 3/08* (2006.01)
(58) Field of Classification Search
 USPC .......................................................... 60/650
 See application file for complete search history.

(56) References Cited

U.S. PATENT DOCUMENTS

2017/0101931 A1* 4/2017 Armstrong ................ F02C 6/18
2018/0187597 A1* 7/2018 Apte .................... H02K 7/1823

OTHER PUBLICATIONS

Novales, D., et al., "Sensitivity analysis of supercritical CO2 power cycle energy and exergy efficiencies regarding cycle component efficiencies for concentrating solar power," Department of Thermal Engineering, University of the Basque Country, Spain and Departmetn of Mechanical Engineering, SENER Ingenieria y Sistemas S.A., Spain, 53 pages.
Crespi, Francesco, et al., "Supercritical carbon dioxide cycles for power generation: A review," Applied Engery, Elsevier Science Publishers, GB, vol. 195, Mar. 17, 2017, pp. 152-183.
International Searching Authority, Search Report issued in PCT/EP2022/081641, mailed Feb. 21, 2023 (3 pages).
International Preliminary Examining Authority, Notification of Transmittal of the International Preliminary Report on Patentability issued in PCT/EP2022/081641, mailed Feb. 1, 2024 (11 pages).
Liao, Gaoliang, et al., "Effects of technical progress on performance and application of supercritical carbon dioxide power cycle: A Review," Energy Conversion and Management, Elsevier Science Publishers, Oxford, GB, vol. 199, Aug. 31, 2019 (23 pages).
Vasquez Padilla, Ricardo, et al., "Exergetic analysis of supercritical CO2 Brayton cycles integrated with solar central receivers," Applied Energy, Elsevier Science Publishers, GB, vol. 148, Apr. 3, 2015, pp. 348-365.

* cited by examiner

SUPERCRITICAL CARBON DIOXIDE REGENERATIVE BRAYTON CYCLE WITH MULTIPLE RECUPERATORS AND AUXILIARY COMPRESSORS

BACKGROUND OF THE INVENTION

Field of the Invention

The present invention is applicable in the energy industry, for the conversion of heat sources at low-, medium- or high-temperature, which allows generating energy in the turbine with high energy efficiency, said energy being mechanical or electrical energy, in the latter case when the turbine is coupled to an electric generator.

Description of the Related Art

Supercritical carbon dioxide regenerative Brayton cycle with multiple recuperators and auxiliary compressors (referred to as "multiple recompression cycle" from now on) improves the energy efficiency of the conversion of thermal energy from low-, medium- and high-temperature heat sources to mechanical or electrical energy when compared to state-of-the-art regenerative Brayton recompression cycle.

In some methods used today (such as state-of-the-art recompression cycles as the one described in D. Novales, A. Erkoreka, V. De la Peña, B. Herrazti, Sensitivity analysis of supercritical CO2 power cycle energy and exergy efficiencies regarding cycle component efficiencies for concentrating solar power, Energy Conversion and Management 182 (2019) 430-450.), a maximum number of two recuperators are used in series to recover the heat from the turbine outlet. However, the heat recovery of this cycle is not optimized.

SUMMARY OF THE INVENTION

The object of the present invention is to improve the energy efficiency of supercritical carbon dioxide recompression cycles of the state-of-the-art through the use of a new cycle configuration that improves the heat recovery process.

Any heat source could be used for the cycle, such as heat of solar origin or nuclear origin, heat obtained from the combustion of matter such as fossil fuels, biomasses, waste or biogas, waste heat coming from any process or any other heat source which reaches the temperatures required in the present invention.

For cycle definition, the first step is to define the optimum number of recuperators N to be installed in the cycle (where N≥3). The optimum number of recuperators in the cycle is calculated as follows.

First, Turbine Inlet (stream TI according to FIG. 1) pressure ($P_{TI}$) and temperature ($T_{TI}$) and turbine outlet (stream $RHI_N$ according to FIG. 1) pressure ($P_{RHI_N}$) are defined. $RHI_N$ stands for Recuperator N Hot Inlet, see FIG. 1. Also, turbine isentropic efficiency ($\eta_{s,T}$) is defined. Then, turbine outlet temperature ($T_{RHI_N}$) is obtained using thermophysical properties of $CO_2$ and turbine isentropic efficiency definition as per equations (1) to (5). Where, $h_{TI}$ stands for the specific enthalpy of stream TI, $s_{TI}$ stands for the specific entropy of stream TI, $h_{RHI_N,s}$ stands for the specific enthalpy of stream $RHI_N$ for an adiabatic and isentropic expansion, $h_{RHI_N}$ stands for the specific enthalpy of stream $RHI_N$.

$$h_{TI} = f(T_{TI}, P_{TI}) \tag{1}$$

$$s_{TI} = f(T_{TI}, P_{TI}) \tag{2}$$

$$h_{RHI_N,s} = f(P_{RHI_N}, s_{TI}) \tag{3}$$

$$h_{RHI_N} = h_{TI} - \eta_{s,T} * (h_{TI} - h_{RHI_N,s}) \tag{4}$$

$$T_{RHI_N} = f(P_{RHI_N}, h_{RHI_N}) \tag{5}$$

Also, main compressor inlet (stream MCI according to FIG. 1) pressure ($P_{in}$) and temperature ($T_{in,1}$) are defined. Main compressor inlet pressure shall be the same or lower than turbine outlet pressure (pressure at state $RHI_N$ according to FIG. 1). Main compressor outlet pressure ($P_{out}$) shall be the same or higher than turbine inlet pressure (pressure at state TI according to FIG. 1). Isentropic efficiency of each compressor is defined as $\eta_{s,C,i}$, being i the number of the compressor, numbering the compressors from the left to the right in FIG. 1 (i.e., for main compressor i=1, for auxiliary compressor 1 i=2, etc.). Then, equations (6) to (10) are applied to determine the outlet temperature of the $i^{th}$ compressor ($T_{out,i}$), where i is defined as the number of times equations (6) to (10) have been used (the iteration number), starting with i=1 for the first iteration. $T_{in,i}$ stands for the inlet temperature of the $i^{th}$ compressor, $h_{in,i}$ stands for the inlet specific enthalpy of the $i^{th}$ compressor, $s_{in,i}$ stands for the inlet specific entropy of the $i^{th}$ compressor, $h_{out,s,i}$ stands for the outlet specific enthalpy of the of the $i^{th}$ compressor for an adiabatic and isentropic compression, $h_{out,i}$ stands for the specific enthalpy of the stream leaving the $i^{th}$ compressor, $T_{in,1}$ is defined as the temperature of stream MCI and $pinch_i$ is defined as the minimum temperature difference between the cold stream and hot stream of the $i^{th}$ recuperator.

$$h_{in,i} = f(T_{in,i}, P_{in}) \tag{6}$$

$$s_{in,i} = f(T_{in,i}, P_{in}) \tag{7}$$

$$h_{out,s,i} = f(P_{out}, s_{in,i}) \tag{8}$$

$$h_{out,i} = h_{in,i} + \frac{h_{out,s,i} - h_{in,i}}{\eta_{s,C,i}} \tag{9}$$

$$T_{out,i} = f(P_{out}, h_{out,i}) \tag{10}$$

Once we get $T_{out,i}$, if equation (11) is not fulfilled, equations (6) to (10) are again applied using $T_{in,i} = T_{out,i-1} + pinch_{i-1}$ and $P_{in}$ as starting point of the new iteration.

$$T_{out,i} \geq T_{RHI_N} - pinch_i \tag{11}$$

The optimum number of recuperators N that can be included in the present invention cycle is defined as i−1, being i the number of the iteration when the stopping criterion (equation 11) is complied with. One main compressor and N−1 auxiliary compressors are associated with those N recuperators according to the configuration shown in FIG. 1.

In the event that the stopping criterion (equation 11) occurs when $T_{out,i} \approx T_{RHI_N} - pinch_i$, a particular case is obtained in which N recuperators, one main compressor and N auxiliary compressors constitute the optimal configuration.

For example, for a turbine inlet pressure of 20 MPa, a turbine inlet temperature of 680° C., a main compressor inlet pressure of 7.5 MPa, an isentropic efficiency of the turbine of 93% and an isentropic efficiency of all compressors of 95%, the optimum number of recuperators to be included in the cycle is 4.

Obviously, this procedure calculates the optimum number of recuperators with their corresponding auxiliary compressors that could be installed in the cycle to maximize the cycle efficiency. However, a higher or lower number of recuperators with their auxiliary compressors can also be installed if required, but cycle efficiency will decrease for some given turbine inlet temperature and pressure, and turbine outlet pressure.

According to the invention, once defined the optimum number of recuperators of the cycle, N, as indicated previously, the method for generating energy by means of a multiple recompression cycle using supercritical carbon dioxide ($sCO_2$) as a working fluid comprises the following steps, according to the numbering indicated in FIG. 1:

1) $sCO_2$ stream at the Recuperator N Cold Outlet ($RCO_N$) is at pressures between 7.5 MPa and 50 MPa and is heated by means of an external heat source to temperatures between 50° C. and 900° C., reaching stream Turbine Inlet (TI).
2) $sCO_2$ stream TI is expanded in a turbine to a pressure between 3 MPa and 10 MPa (stream Recuperator N Hot Inlet ($RHI_N$)), and generates some mechanical or electrical energy, in the latter case when the turbine is coupled to an electric generator.
3) $sCO_2$ stream $RHI_N$ is cooled in N recuperators. The optimal number of total recuperators N is calculated as described above. The total number of recuperators N are put in series, one after the other.
4) $sCO_2$ stream $RHI_N$ is cooled to stream $RHO_N$ (Recuperator N Hot Outlet) and heats stream $RCI_N$ (Recuperator N Cold Inlet) to $RCO_N$ in the recuperator number N.
5) $sCO_2$ stream $RHI_{N-1}$ is cooled to stream $RHO_{N-1}$ in recuperator number N−1 and heats stream $RCI_{N-1}$ to $RCO_{N-1}$. Stream $RHO_{N-1}$ is split into two streams: $RHI_{N-2}$ and Auxiliary Compressor N−1 Inlet ($ACI_{N-1}$). Stream $ACI_{N-1}$ is compressed in auxiliary compressor N−1 to, preferably, the pressure of stream $RCO_{N-1}$ generating the stream $ACO_{N-1}$ (Auxiliary Compressor N−1 Outlet). Stream $ACO_{N-1}$ is mixed with stream $RCO_{N-1}$, obtaining from the mixture stream $RCI_N$. Stream $RHI_{N-2}$ is sent to recuperator N−2.
6) If N>3, the pattern shown in step 5) is repeated for recuperators N−2 to 2.
7) For recuperator 1, the $sCO_2$ stream $RHI_1$ is cooled to stream $RHO_1$ in recuperator number 1 and heats stream $RCI_1$ to $RCO_1$. Stream $RHO_1$ is split into two streams: CI (Cooler Inlet) and Auxiliary Compressor 1 Inlet ($ACI_1$). Stream $ACI_1$ is compressed in auxiliary compressor 1 to, preferably, the pressure of stream $RCO_1$ generating the stream $ACO_1$. Stream $ACO_1$ is mixed with stream $RCO_1$, obtaining from the mixture stream $RCI_2$. Stream CI is sent to the Cooler.
8) Preferably, to make the heat recovery optimal, the split factors ($\alpha_j$) must ensure a similar heat rate capacity in both streams of each recuperator and a similar pinch value in the hot and cold section of each recuperator. The split factor ($\alpha_j$) is defined as the ratio of $ACI_j$ mass flow rate divided by the total $CO_2$ mass flow being expanded in the turbine (stream TI).
9) Preferably, the temperature of each $ACO_j$ stream must be similar to the temperature of the corresponding $RCO_j$ stream with which is mixed.
10) Preferably, the pinch values of all recuperators must be similar between them.
11) $sCO_2$ stream CI (Cooler Inlet) is cooled down to a temperature between −10° C. and 70° C. (preferably 32° C.) using any external cooling sink, reaching stream MCI (Main Compressor Inlet).
12) $sCO_2$ stream MCI is compressed in the main compressor to the same or higher pressure than the one defined for the turbine inlet (stream TI). The outlet of the main compressor is stream $RCI_1$.
13) Stream $RCI_1$ is heated to stream $RCO_1$ in recuperator 1 using heat transferred from stream $RHI_1$ to stream $RHO_1$. Then, the stream $RCO_1$ is mixed with stream $ACO_1$ and the mixture is stream $RCI_2$.
14) Pattern shown in step 13) is repeated for recuperators 2 to N−1.
15) Stream $RCI_N$ is heated to stream $RCO_N$ in recuperator N by cooling stream $RHI_N$ to stream $RHO_N$.

The multiple recompression cycle of the invention improves the efficiency of the state-of-the-art recompression cycle, which has only two recuperators and one auxiliary compressor. An example of this increase in efficiency can be seen in Table 1. The comparison of these two cycles allows a better understanding of the key aspect of the present invention with respect to the heat recovery in the recuperators.

FIG. 2 presents the schematic diagram of the state-of-the-art recompression cycle. FIG. 3 represents the Temperature-Thermal Power Exchange diagram within the two recuperators of the FIG. 2 recompression cycle for the Table 1 example. The state-of-the-art recompression cycle configuration does not permit a proper heat recovery of the $sCO_2$ stream leaving the turbine at 548° C. It only permits heating the high pressure $sCO_2$ stream up to 506° C. (stream 14 of FIG. 2). The separation of the temperature profiles occurs in both recuperators (see FIG. 3), but it is more notorious in the high temperature recuperator.

Following the above presented steps 1) to 15), for 680° C. and 20 MPa inlet conditions on the turbine and 7.5 MPa in the outlet, the configuration of the present invention presented in FIG. 4 is obtained. Table 1 compares cycles with equal isentropic efficiencies in turbomachinery and equal effectiveness values in all the heat exchangers. Four recuperators and three auxiliary compressors are the optimal configuration following the aforementioned steps. As can be seen in FIG. 5 Temperature-Thermal Power Exchange diagram, for the same outlet turbine temperature as for the recompression cycle (548° C.), the heat recovery on the present invention permits to reach 537° C. (stream 14 of FIG. 4) in the high pressure $sCO_2$ stream.

Even if the compression work is higher in the present invention case, in Table 1 it can be seen that efficiency improves by 3.84 points, thanks to a more efficient heat recovery in the recuperators due to the configuration of the present invention. This improvement in efficiency allows increasing the electrical or mechanical energy generated per operating hour for the same heat input.

TABLE 1

Comparison between recompression cycle and present invention

| Parameter | Recompression cycle | Present invention |
|---|---|---|
| Turbine inlet temperature [° C.] | 680 | 680 |
| Turbine inlet pressure [MPa] | 20 | 20 |
| Turbine outlet pressure [MPa] | 7.5 | 7.5 |
| Main compressor inlet temperature [° C.] | 32 | 32 |
| Turbine isentropic efficiency [%] | 93 | 93 |
| All compressors isentropic efficiency [%] | 95 | 95 |
| Number of recuperators in the cycle | 2 | 4 |
| Cycle efficiency | 53.42% | 57.26% |

The possibility of using at least one intercooling stage in the main compression process is contemplated. In the cycles of the state-of-the-art such as the recompression cycle, the use of one or various intercooling stages in the main compression process reduces the compression work, but it makes the heat recovery process more irreversible, mainly in the high temperature recuperator. This is because the high temperature recuperator needs to exchange more heat when the intercooling is present. Since the heat capacity rate of the hot side stream in the high temperature recuperator is lower than the heat capacity rate of the cold side stream, the additional heat required to be exchanged in the high temperature recuperator, generates a higher temperature difference between the streams in the hot section of this recuperator. Consequently, more irreversibilities are present in the high temperature recuperator and this effect reduces the efficiency of the cycle. The effect of the efficiency increase due to compression work reduction does not always compensate the efficiency reduction due to a worse heat recovery (as shown in Table 2).

TABLE 2

Comparison between recompression cycle and present invention with one intercooling stage

| Parameter | Recompression cycle | Present invention |
|---|---|---|
| Turbine inlet temperature [° C.] | 680 | 680 |
| Turbine inlet pressure [MPa] | 20 | 20 |
| Turbine outlet pressure [MPa] | 7.5 | 7.5 |
| First main compressor inlet temperature [° C.] | 32 | 32 |
| Second main compressor inlet temperature [° C.] | 40 | 40 |
| Turbine isentropic efficiency [%] | 93 | 93 |
| All compressors isentropic efficiency [%] | 95 | 95 |
| Number of recuperators in the cycle | 2 | 4 |
| Cycle efficiency | 52.64% | 58.05% |

Table 2 presents the same cycles as Table 1 but including an intercooling stage in the main compression process. In Table 2 it can be seen that the recompression cycle efficiency is reduced from 53.42% (Table 1) to 52.64% (Table 2) due to the inclusion of the intercooling stage. On the other hand, introducing the same intercooling stage to the present invention cycle permits to increase the thermal efficiency of the cycle from 57.26% (Table 1) to 58.05% (Table 2). The intercooling stage on the present invention can be seen in FIG. 6.

As proven above, the proposed strategy of using N recuperators in the cycles of the present invention reduces the inefficiencies of the heat recovery process due to the use of intercooling in the main compression process. The use of at least one intercooling stage in the main compression process reduces the temperature of $RCI_1$ stream (see FIG. 1 and stream 1 of FIG. 6) and consequently the $RHO_1$ temperature (FIG. 1) is also reduced, increasing the total heat recovery while maintaining a similar $RCO_N$ stream temperature (FIG. 1). This is obtained by means of the following steps:

16) Instead of using one main compressor to compress the MCI stream directly to $RCI_1$ stream, the main compression process is performed with at least one intercooling stage and then steps 1) to 15) are applied to define the multiple recompression cycle.

When intercooling is used, the application of equations (6) to (11) has to consider the intercooling effect on the main compression process for the calculation of $T_{out,1}$ (this is the stream $RCI_1$ of FIG. 1). Since $T_{out,1}$ with intercooling is lower than $T_{out,1}$ without intercooling, the iterative process of equations (6) to (11) to determine the optimum number of recuperators, may lead to a multiple recompression cycle with more than N recuperators than the cycle without intercooling. Once the optimal number of N recuperators is calculated for the cycle with intercooling using the method explained previously for some specific $CO_2$ conditions and equipment specifications, steps 1) to 15) are applied to define the multiple recompression cycle.

As shown in Table 3, for medium temperature heat sources the efficiency of the multiple recompression cycle is higher than the efficiency of the state-of-the-art cycles, with an increase of efficiency of 0.94 points. FIG. 8 presents the schematic of the multiple recompression cycle obtained from the fulfilment of the steps above for the medium temperature turbine inlet conditions presented in Table 3. FIG. 9, presents the Temperature-Thermal Power Exchange diagram for the present invention case of Table 3.

TABLE 3

Comparison between state-of-the-art water-steam cycle and present invention cycle for a medium temperature solar power plant

| Parameter | State-of-the-art water-steam cycle | Present invention |
|---|---|---|
| Turbine inlet temperature [° C.] | 377 | 377 |
| Turbine inlet pressure [MPa] | <20 | 17 |
| Turbine outlet pressure [MPa] | Vacuum | 7.5 |
| Main compressor inlet temperature [° C.] | N/A | 32 |
| Turbine isentropic efficiency [%] | — | 93 |
| All compressors isentropic efficiency [%] | — | 95 |
| Number of recuperators in the cycle | N/A | 3 |
| Cycle efficiency | 39.40% | 40.34% |

As presented in Table 4, for low temperature heat sources, the efficiency of the multiple recompression cycle is higher than the efficiency of the state-of-the-art Organic Rankine Cycles (ORC cycles), with an increase of efficiency of 2.1 points. FIG. 10 shows the schematic of the multiple recompression cycle obtained from the fulfilment of the steps above for the turbine inlet and outlet conditions presented in Table 4. FIG. 11 presents the Temperature-Thermal Power Exchange diagram for the present invention case of Table 4.

TABLE 4

Comparison between state-of-the-art ORC cycle and present invention cycle for a low temperature Internal Combustion Engine cooling water heat recovery

| Parameter | State-of-the-art ORC cycle | Present invention |
|---|---|---|
| Heat source inlet hot water temperature [° C.] | 90 | 90 |
| Heat source outlet hot water temperature [° C.] | 83 | 83 |
| Cooling water inlet temperature [° C.] | 26 | 26 |
| Cooling water outlet temperature [° C.] | 32 | 32 |
| Turbine inlet temperature [° C.] | ≈85 | 85 |
| Turbine inlet pressure [MPa] | <1 | 8.6 |
| Turbine isentropic efficiency [%] | — | 93 |
| All compressors isentropic efficiency [%] | — | 95 |
| Number of recuperators in the cycle | N/A | 3 |
| Number of auxiliary compressors in the cycle | N/A | 3 |
| Cycle efficiency | 6.4% | 8.5% |

As shown in Table 5, for high-temperature heat sources with the availability of a cold sink that allows the $CO_2$ to cool down to temperatures below its critical temperature, the efficiency of the multiple recompression cycle is 1.23 points greater than the efficiency of the recompression cycle. In this case, the CO2 is expanded to a subcritical pressure of 5.3 MPa and the turbine inlet pressure is increased to 35 MPa to take advantage of heat sources in the form of hot mass flows that require to cool down about 240° C. In this way, the pressure jump available in the turbine allows the CO2 to be cooled through an expansion from 680° C. to 437° C. FIG. 12 presents the diagram of the optimal multiple recompression cycle obtained from the fulfilment of the steps described above for the turbine inlet and outlet conditions presented in Table 5. FIG. 13 presents the Temperature-Thermal Power Exchange diagram during the heat recovery process for the present invention case in Table 5.

TABLE 5

Comparison between the recompression cycle and the present invention for a cold sink that allows the CO2 to be cooled to temperatures below the critical temperature and a hot source in the form of a hot mass flow that requires a thermal jump of about 240° C.

| Parameter | Recompression cycle | Present invention |
|---|---|---|
| Turbine inlet temperature [° C.] | 680 | 680 |
| Turbine inlet pressure [MPa] | 35 | 35 |
| Turbine outlet pressure [MPa] | 5.3 | 5.3 |
| Main compressor inlet temperature [° C.] | 5 | 5 |
| Turbine isentropic efficiency [%] | 93 | 93 |
| All compressors isentropic efficiency [%] | 95 | 95 |
| Number of recuperators in the cycle | 2 | 3 |
| Cycle efficiency | 58.39% | 59.62% |

If a heat transfer fluid or a hot stream is used as the heat source, the use of one or various steps of reheating is also contemplated for the expansion process of the present invention cycle. However, if the temperature profiles on both sides of the heat source heat exchanger are parallel to each other, meaning that the heat rate capacity of the fluids in both sides of the heat source heat exchanger are similar, the inclusion of the reheating has a negligible effect on the increase of the energy efficiency of the cycle.

DESCRIPTION OF THE DRAWINGS

To complement the description which is being made and for the purpose of aiding to better understand the features of the invention according to a preferred practical embodiment thereof, a set of drawings is attached as an integral part of said description, in which the following has been depicted with an illustrative and non-limiting manner.

PREFERRED EMBODIMENT OF THE INVENTION

As has been set forth, the invention comprises combinations of several elements which have synergistic effects on the improvement of the energy efficiency and on the use of different heat source temperature ranges. Five embodiments are described below, without these examples being a limitation to the possibilities of combination and application of the inventive concepts described above.

Figure 1:
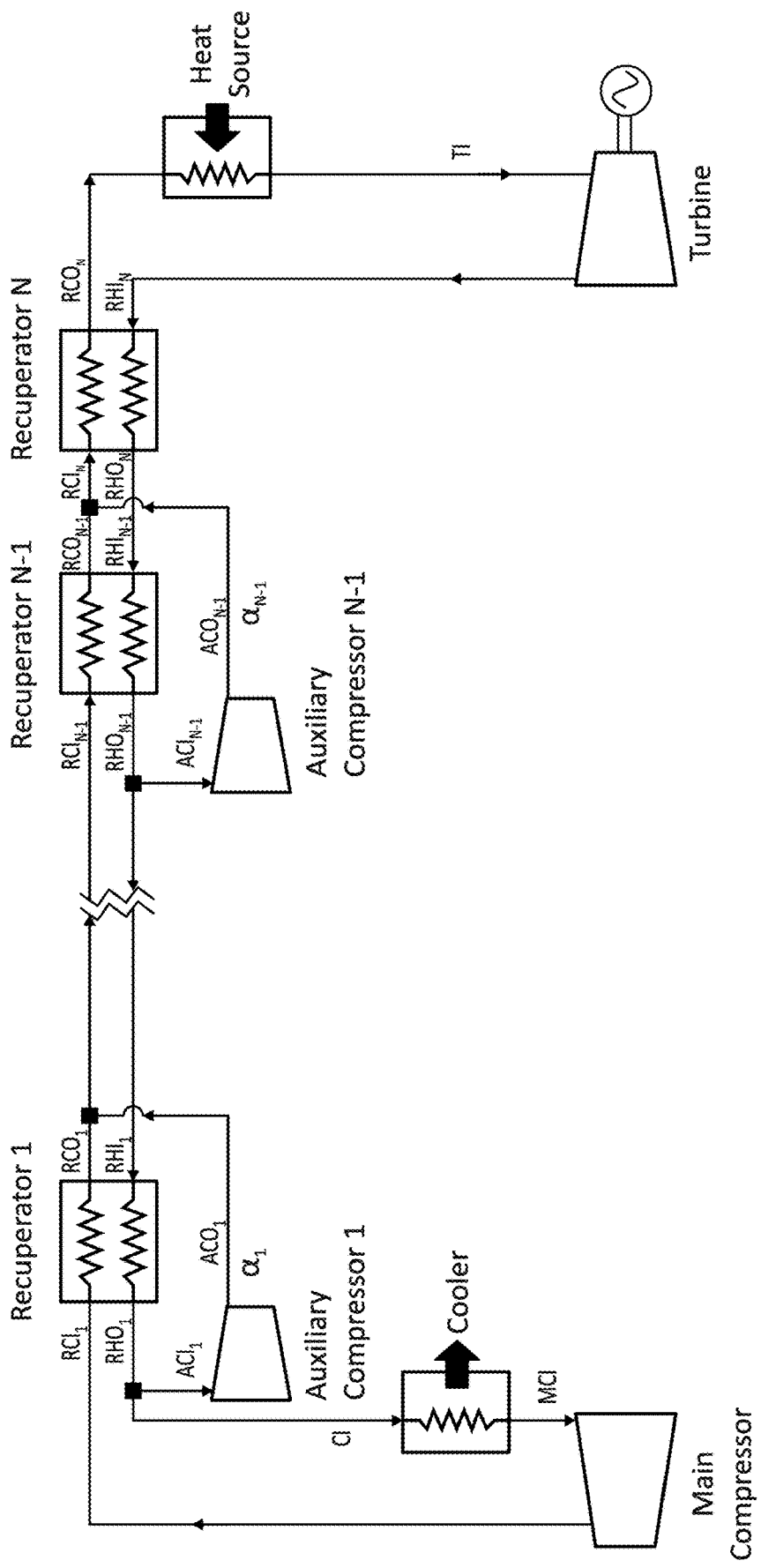
FIG. 1—Schematic diagram of the multiple recompression cycle with N recuperators.
Figure 2:
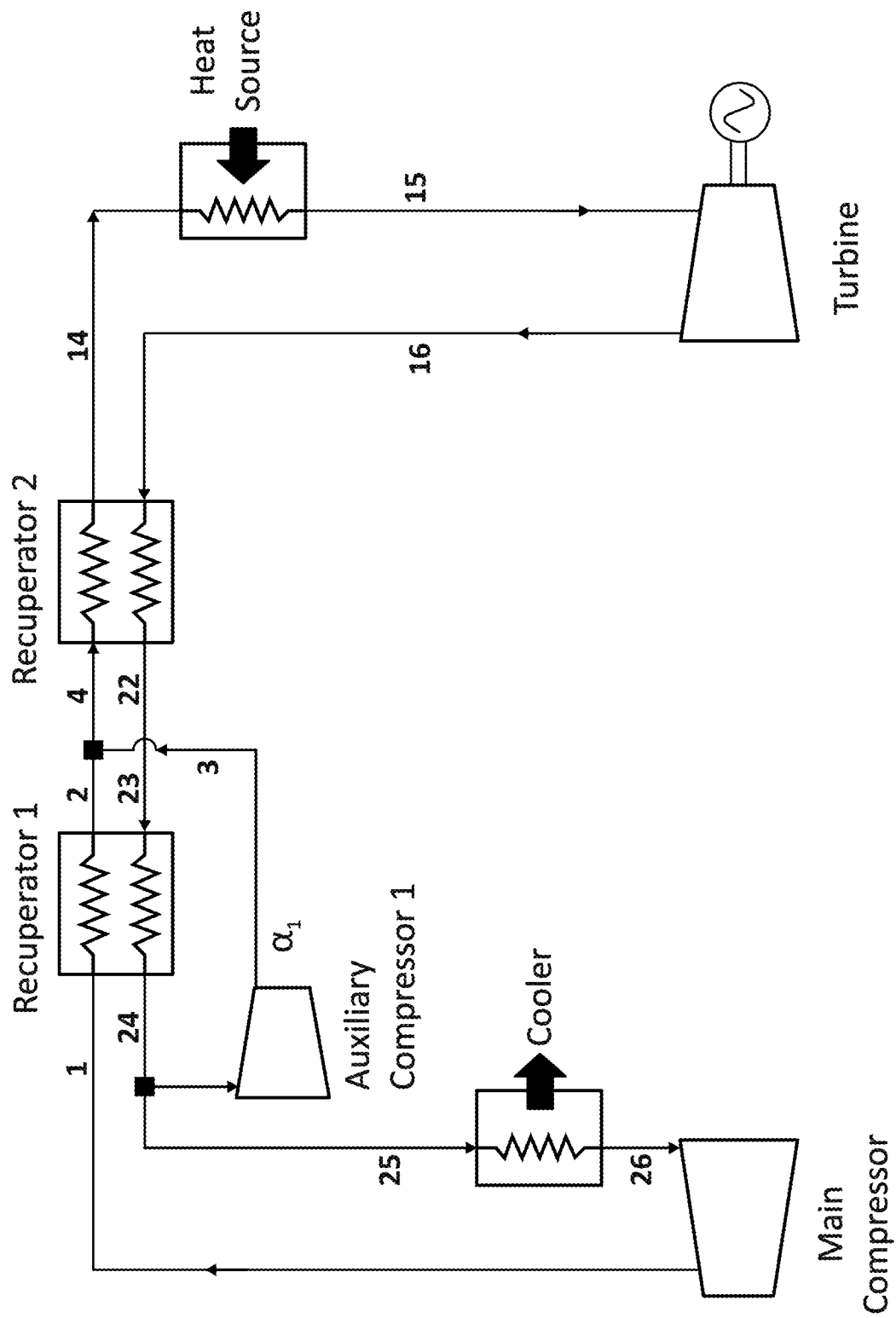
FIG. 2—Schematic diagram of the state-of-the-art recompression cycle.
Figure 3:
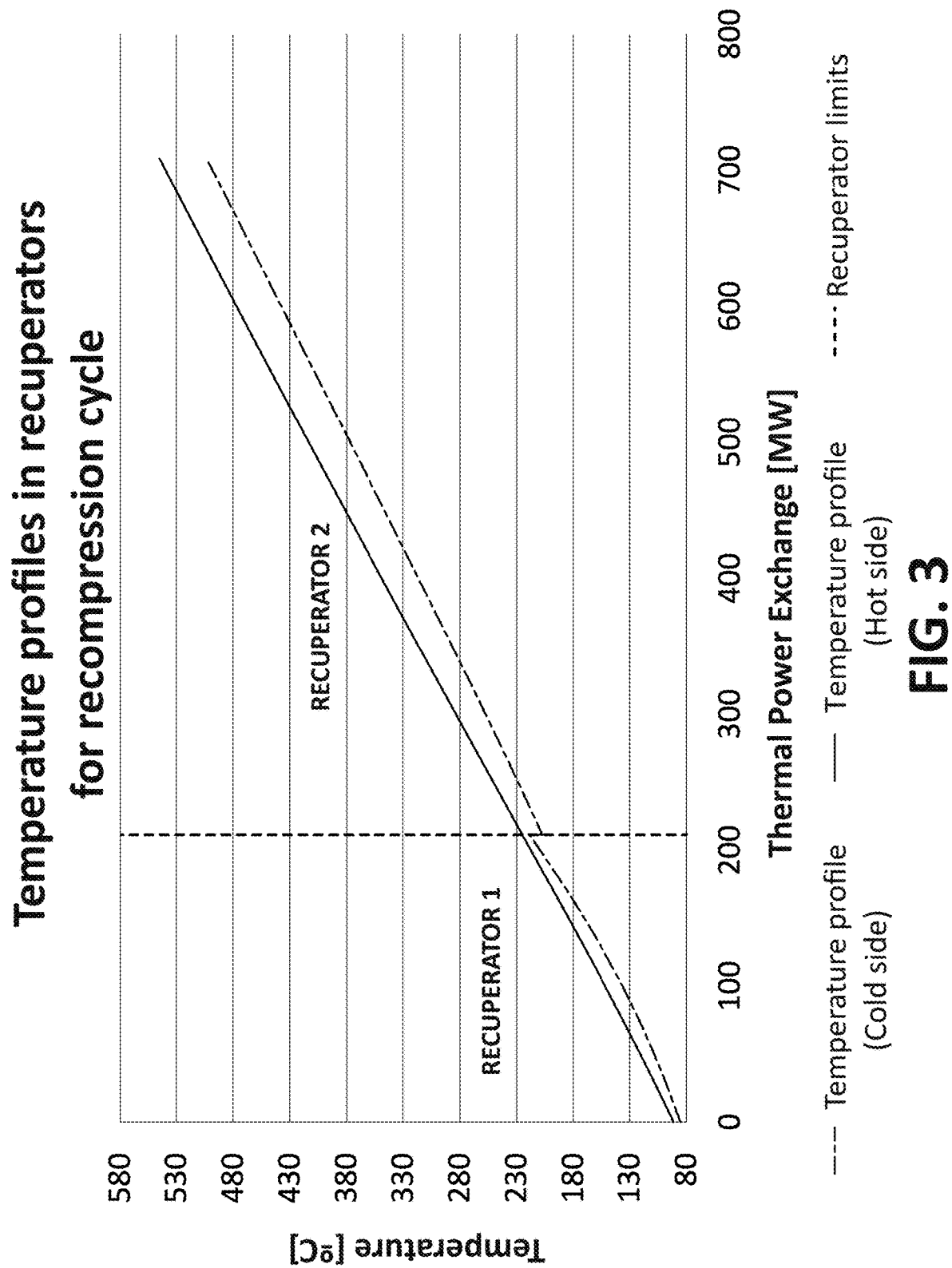
FIG. 3—Temperature—Thermal Power Exchange diagram of the heat recovery process within the two recuperators of the state-of-the-art recompression cycle for a high temperature heat source.
Figure 4:
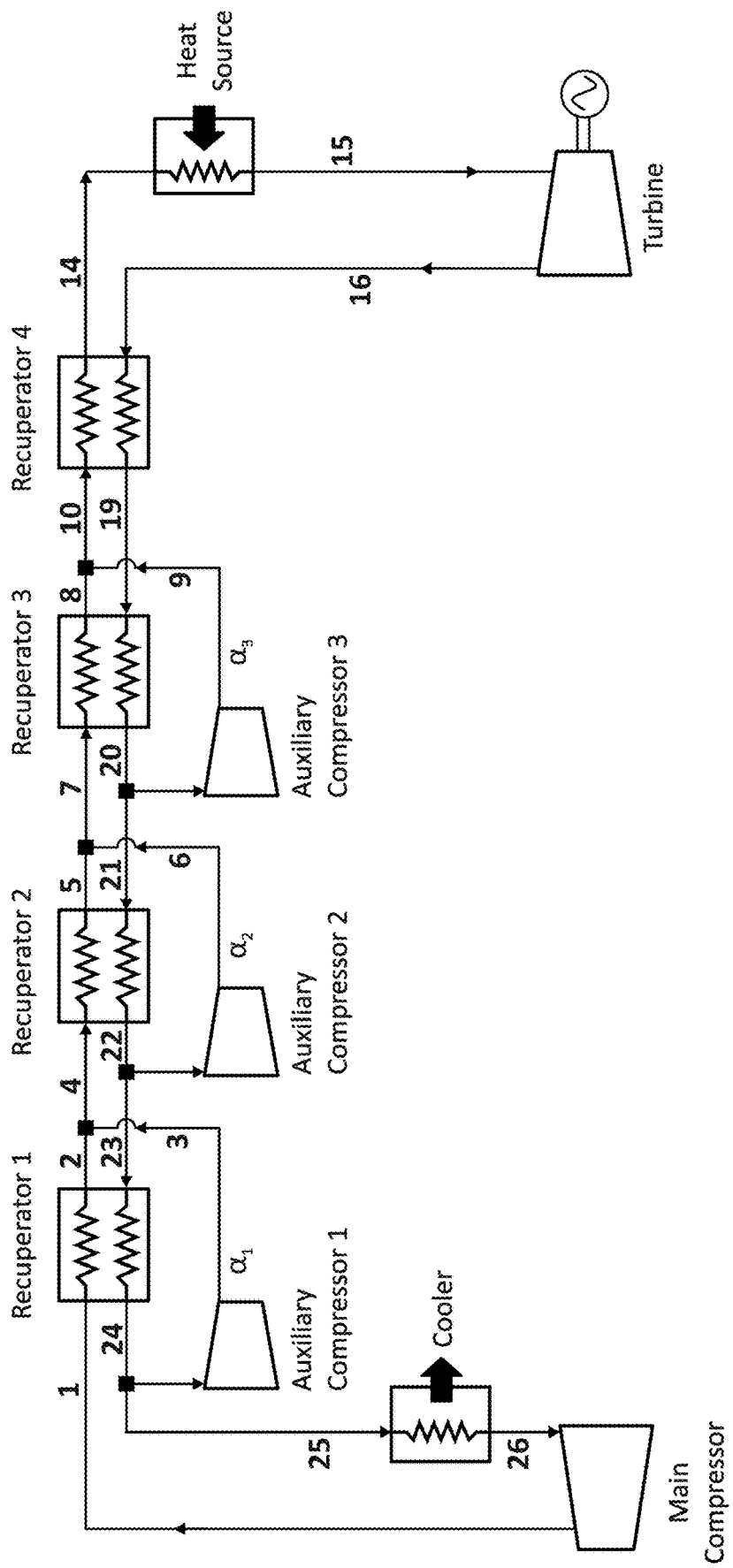
FIG. 4—EMBODIMENT 1, schematic diagram of the multiple recompression cycle with four recuperators.
Figure 5:
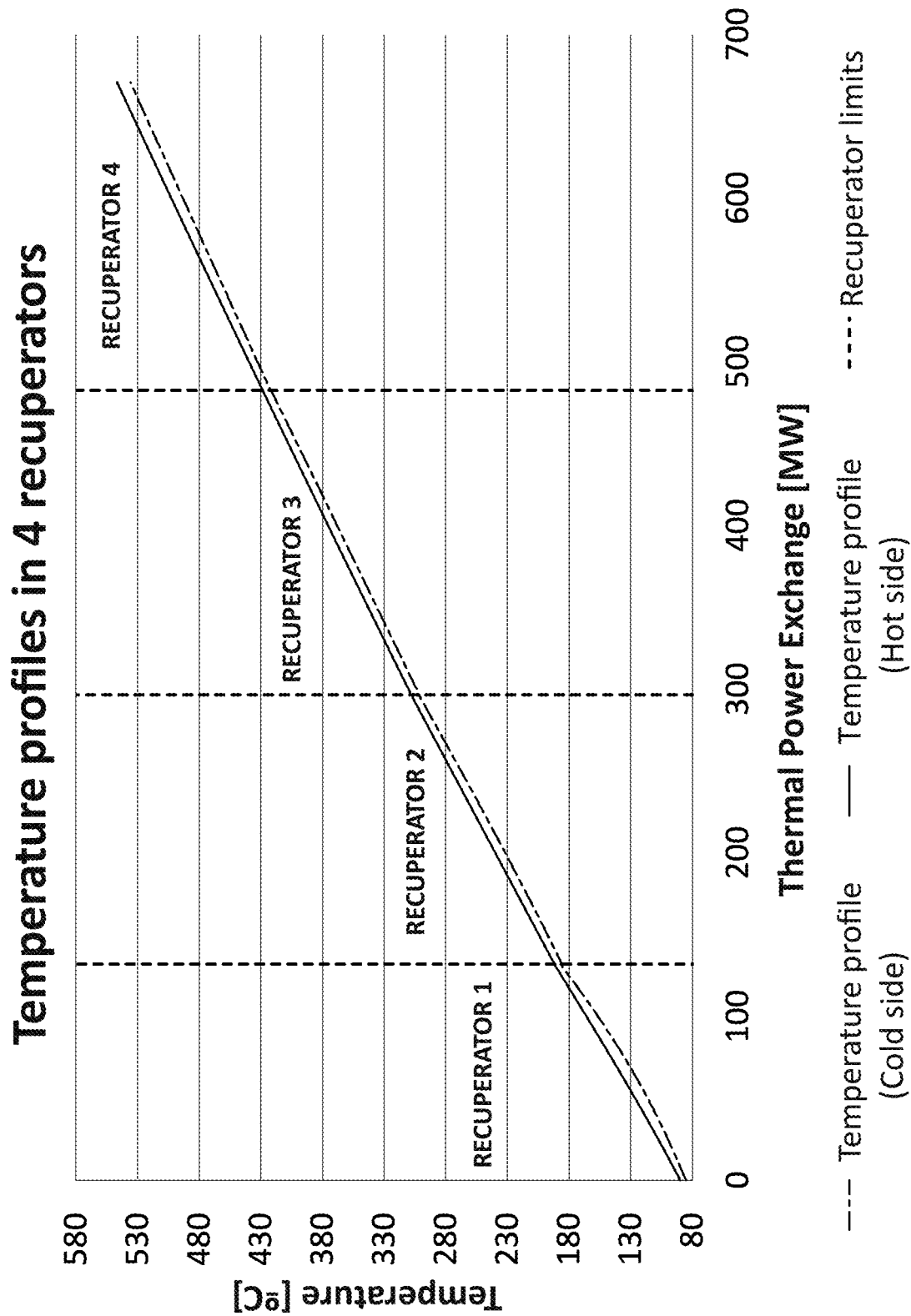
FIG. 5—Temperature—Thermal Power Exchange diagram of the heat recovery process within the four recuperators of the multiple recompression cycle for a high temperature heat source.

FIG. 4 shows a highly regenerative Brayton cycle with multiple recuperators and auxiliary compressors driven by a high-temperature heat source stream.

The cycle depicted in said FIG. 4 is a preferred embodiment of the invention for electric generation by means of a heat source available at high temperature. This preferred embodiment, has four recuperators and three auxiliary compressors. It must be noted that, from now on, when making reference to the total $sCO_2$ mass flow rate, total $sCO_2$ mass flow being expanded in the turbine is being referred.

In view of said FIG. 4, the high temperature heat source permits to heat up the $sCO_2$ stream leaving the recuperator 4 (stream 14) up to 680° C. at 20 MPa (stream 15). The stream 15 is expanded in the turbine to 548° C. and about 7.5 MPa (stream 16). Stream 16 enters the hot side of recuperator 4 and is cooled down to 428.5° C. (stream 19) by means of heating stream 10 from 422° C. to 537° C. (stream 14). Stream 19 is then cooled down in the recuperator 3 to 308° C. (stream 20) by heating stream 7 from 301.5° C. to 421.5° C. (stream 8). Auxiliary compressor 3 compresses the 6.4% of the total $sCO_2$ mass flow rate from about 7.5 MPa and 308° C. to about 20 MPa and 429° C. (stream 9). Stream 9 is mixed with stream 8 to obtain the stream 10 mentioned above. The 93.6% of total $sCO_2$ mass flow rate goes to the hot side inlet of recuperator 2 at about 7.5 MPa and 308° C. (stream 21).

Stream 21 is then cooled down in the recuperator 2 to 191.5° C. (stream 22) by heating stream 4 from 185.5° C. to 302° C. (stream 5). Auxiliary compressor 2 compresses the 13.2% of the total $sCO_2$ mass flow rate from about 7.5 MPa and 191.5° C. to about MPa and 299° C. (stream 6). Stream 6 is mixed with stream 5 to obtain stream 7. The 80.4% of the total $sCO_2$ mass flow rate goes to the hot side inlet of recuperator 1 at about 7.5 MPa and 191.5° C. (stream 23).

Stream 23 is then cooled down in the recuperator 1 to 90° C. (stream 24) by heating stream 1 from 85° C. to 187° C. (stream 2). Auxiliary compressor 1 compresses the 28.8% of the total $sCO_2$ mass flow rate from about 7.5 MPa and 90° C. to about 20 MPa and 183° C. (stream 3). Stream 3 is mixed with stream 2 to obtain stream 4. The 51.6% of the total $sCO_2$ mass flow rate goes to the cooler at about 7.5 MPa and 90° C. (stream 25).

Stream 25 is cooled in the cooler from about 90° C. to about 32° C. (stream 26). Stream 26 is compressed in the main compressor from about 32° C. and 7.5 MPa to about 85° C. and 20 MPa (stream 1).

This embodiment allows achieving increases up to 3.8 points with respect to the state-of-the-art recompression cycle working with equipment with identical isentropic efficiencies and effectiveness. Said FIG. 4 shows a preferred embodiment for the exploitation of a heat source at high temperature.

Figure 6:
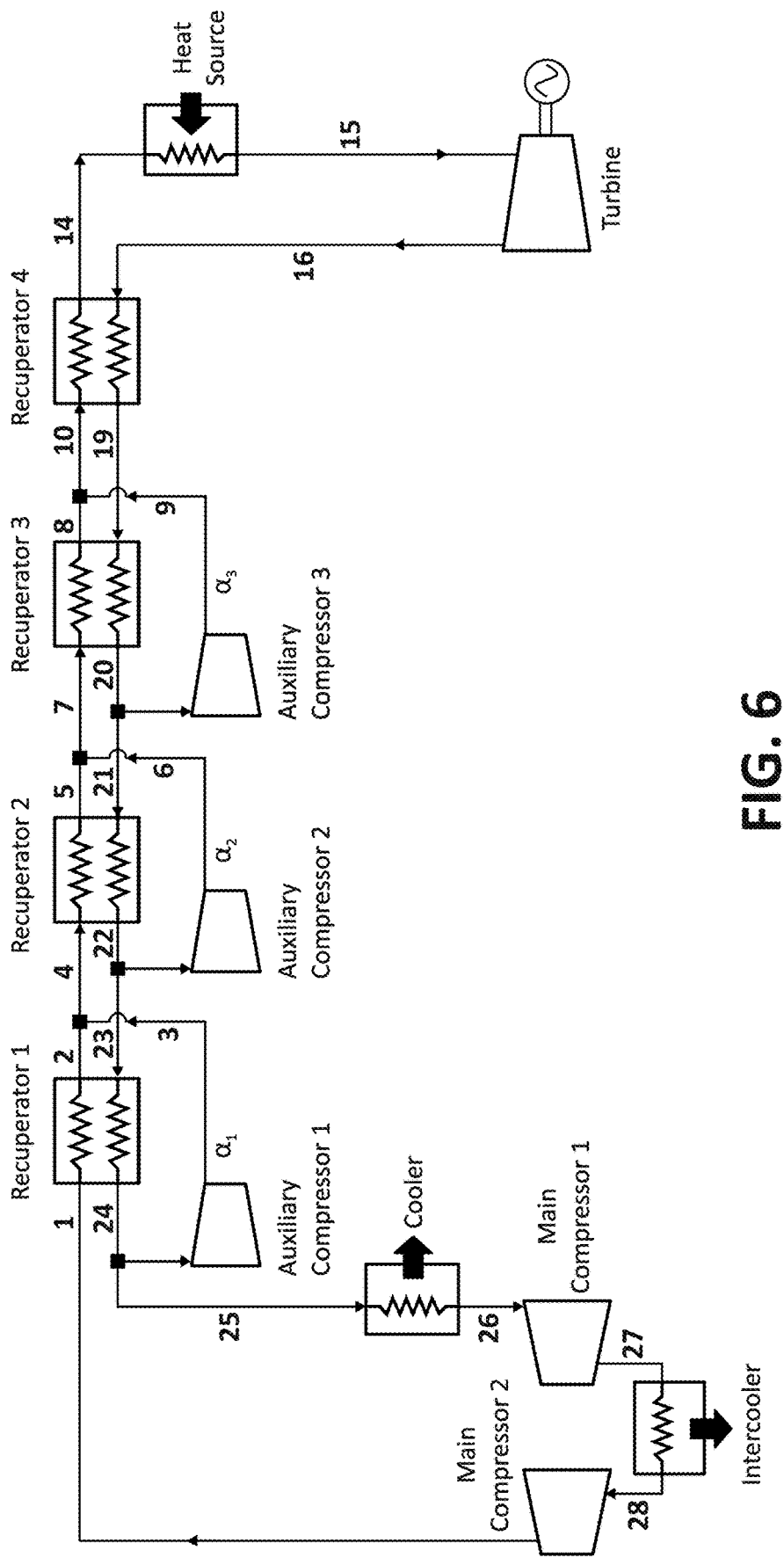
FIG. 6—EMBODIMENT 2, schematic diagram of the multiple recompression cycle with four recuperators and one intercooling stage.
Figure 7:
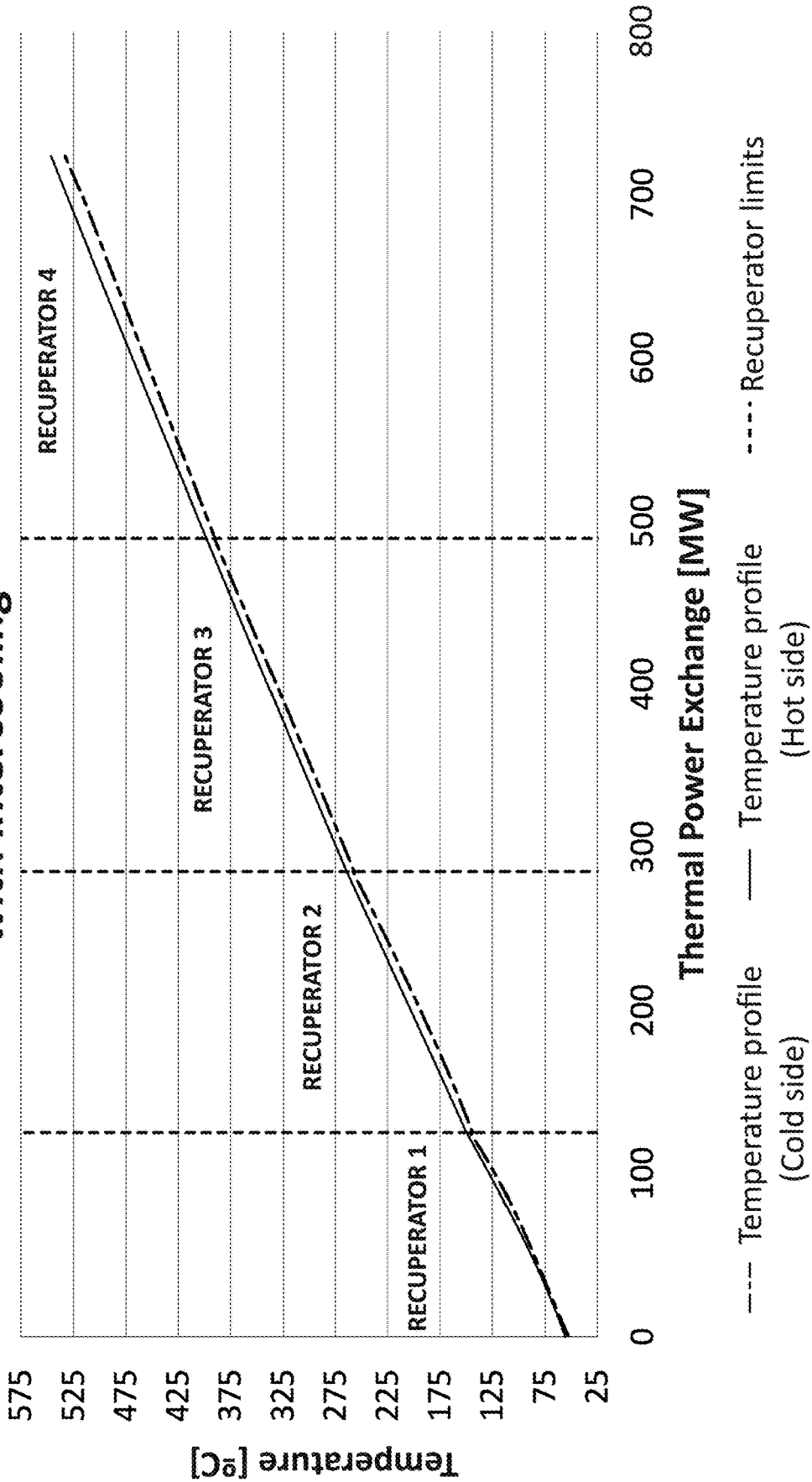
FIG. 7—Temperature—Thermal Power Exchange diagram of the heat recovery process within the four recuperators of the multiple recompression cycle including one intercooling stage for a high temperature heat source.

On the other hand, according to a second embodiment, FIG. 6 shows a multiple recompression cycle that uses a high temperature heat source with an intermediate cooling stage in the main compression process.

The cycle depicted in said FIG. 6 is a preferred embodiment of the invention for electric generation by means of a heat source available at high temperature. This preferred embodiment, has four recuperators, three auxiliary compressors and one intercooling stage in the main compression process.

In view of said FIG. 6, the high temperature heat source permits to heat up the $sCO_2$ stream leaving the recuperator 4 (stream 14) up to 680° C. at 20 MPa (stream 15). The stream 15 is expanded in the turbine to 548° C. and about 7.5 MPa (stream 16). Stream 16 enters the hot side of recuperator 4 and is cooled down to 398° C. (stream 19) by means of heating stream 10 from 390° C. to 534° C. (stream 14). Stream 19 is then cooled down in the recuperator 3 to 264° C. (stream 20) by heating stream 7 from 257° C. to 390.5° C. (stream 8). Auxiliary compressor 3 compresses the 8.2% of the total $sCO_2$ mass flow rate from about 7.5 MPa and 264° C. to about 20 MPa and 380° C. (stream 9). Stream 9 is mixed with stream 8 to obtain stream 10. The 91.8% of the total $sCO_2$ mass flow rate goes to the hot side inlet of recuperator 2 at about 7.5 MPa and 264° C. (stream 21).

Stream 21 is then cooled down in the recuperator 2 to 150° C. (stream 22) by heating stream 4 from 144° C. to 258° C. (stream 5). Auxiliary compressor 2 compresses the 18.4% of the total $sCO_2$ mass flow rate from about 7.5 MPa and 150° C. to about 20 MPa and 252° C. (stream 6). Stream 6 is mixed with stream 5 to obtain stream 7. The 73.4% of the total $sCO_2$ mass flow rate goes to the hot side inlet of recuperator 1 at about 7.5 MPa and 150° C. (stream 23).

Stream 23 is then cooled down in the recuperator 1 to 56° C. (stream 24) by heating stream 1 from 52° C. to 146° C. (stream 2). Auxiliary compressor 1 compresses the 29.3% of the total $sCO_2$ mass flow rate from about 7.5 MPa and 56° C. to about 20 MPa and 140° C. (stream 3). Stream 3 is mixed with stream 2 to obtain stream 4. The 44.1% of the total $sCO_2$ mass flow rate goes to the cooler about 7.5 MPa and 56° C. (stream 25).

Stream 25 is cooled in the cooler from about 56° C. to about 32° C. (stream 26). Stream 26 is compressed in the main compressor 1 from about 32° C. and 7.5 MPa to about 59° C. and 12.25 MPa (stream 27). Stream 27 is cooled to about 40° C. in the intercooler to obtain stream 28. Stream 28 is compressed in main compressor 2 to about 20 MPa and 52° C. (Stream 1).

This embodiment allows achieving increases up to 4.6 points with respect to the state-of-the-art recompression cycle without intercooling working with equipment with identical isentropic efficiencies and effectiveness. Note that this embodiment allows achieving increases up to 5.4 points with respect to the state-of-the-art recompression cycle with intercooling working with equipment with identical efficiencies and effectiveness and an identical intercooling stage. FIG. 6 shows a preferred embodiment for the exploitation of a heat source at high temperature.

Figure 8:
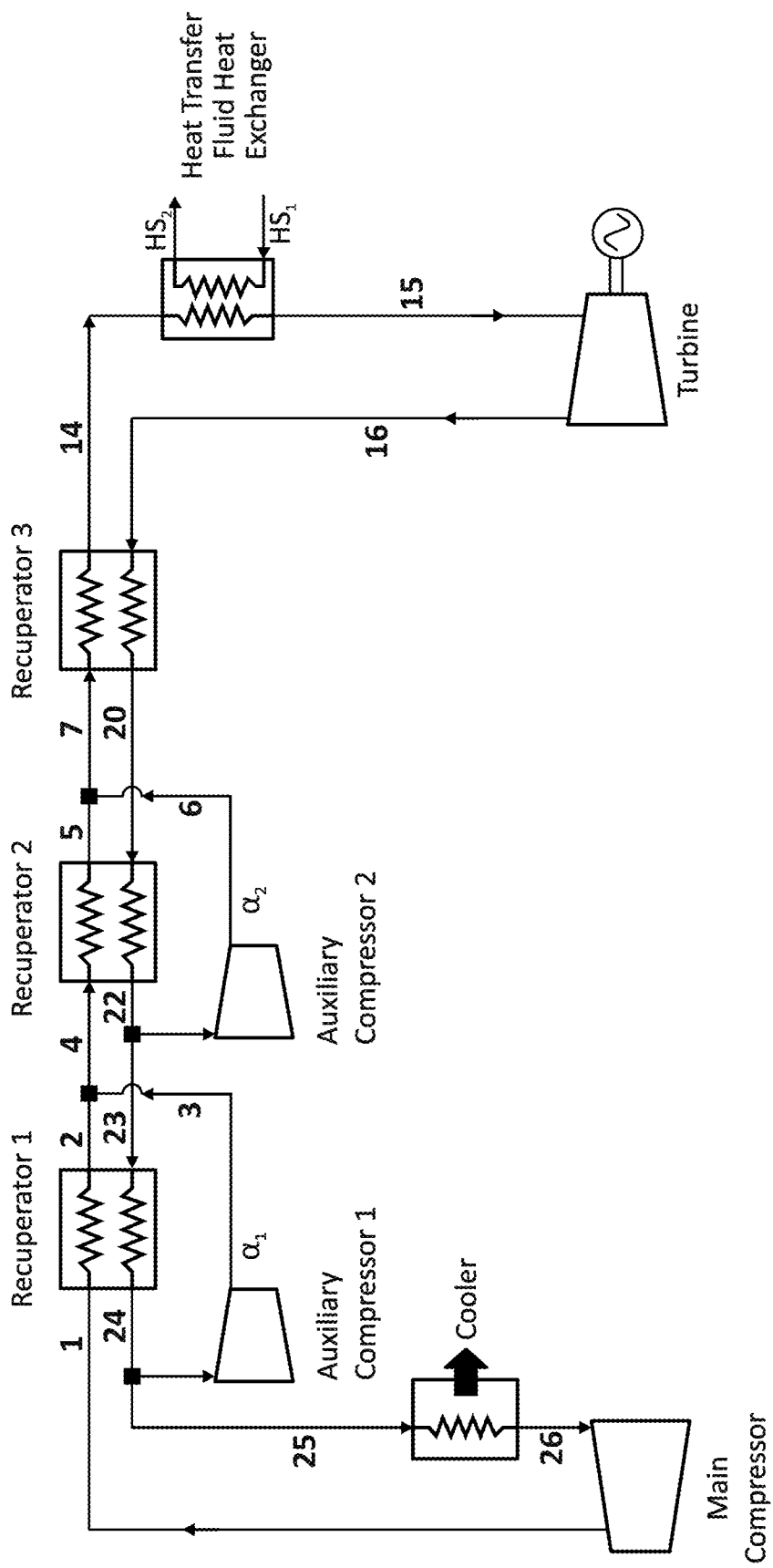
FIG. 8—EMBODIMENT 3, schematic diagram of the multiple recompression cycle with three recuperators.
Figure 9:
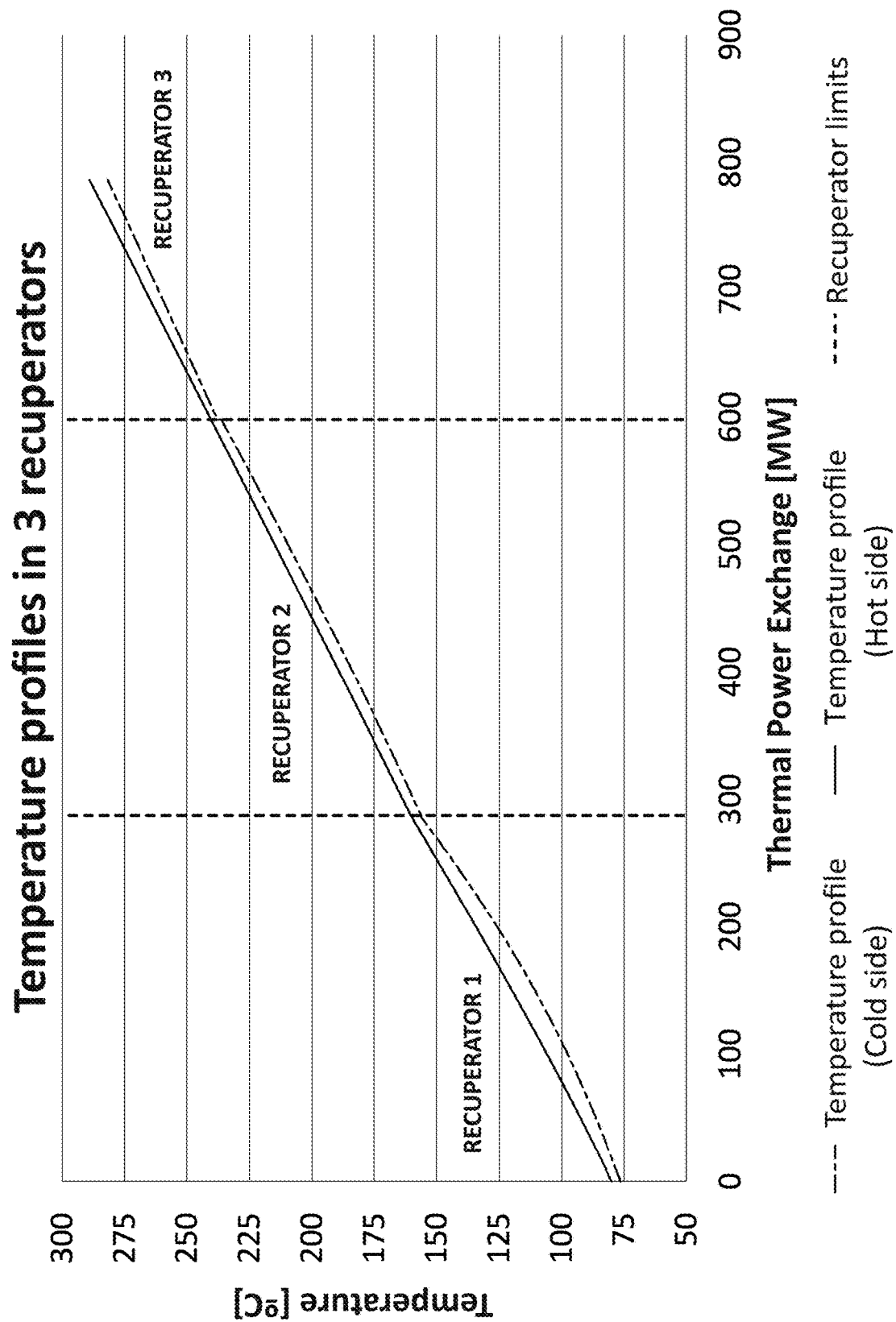
FIG. 9—Temperature—Thermal Power Exchange diagram of the heat recovery process within the three recuperators of the multiple recompression cycle for a medium-temperature heat source.

Likewise, according to a third preferred embodiment, depicted in FIG. 8 there is a multiple recompression cycle using three recuperators and two auxiliary compressors. The cycle depicted in said FIG. 8 is a preferred embodiment of the invention for electric generation by means of a heat source available at medium temperature.

In view of said FIG. 8, the medium temperature heat source permits to heat up the $sCO_2$ stream leaving the recuperator 3 (stream 14) up to 377° C. at 17 MPa (stream 15). The stream 15 is expanded in the turbine to 289° C. and about 7.5 MPa (stream 16).

Stream 16 enters the hot side of recuperator 3 and is cooled down to 240° C. (stream 20) by means of heating stream 7 from 238° C. to 282° C. (stream 14). Stream 20 is then cooled down in the recuperator 2 to 160° C. (stream 22) by heating stream 4 from 156° C. to 236° C. (stream 5). Auxiliary compressor 2 compresses the 16.3% of the total $sCO_2$ mass flow rate from about 7.5 MPa and 160° C. to about 17 MPa and 246° C. (stream 6). Stream 6 is mixed with stream 5 to obtain stream 7. The 83.7% of the total $sCO_2$ mass flow rate goes to the hot side inlet of recuperator 1 at about 7.5 MPa and 160° C. (stream 23).

Stream 23 is then cooled down in the recuperator 1 to 80° C. (stream 24) by heating stream 1 from 76° C. to 156.5° C. (stream 2). Auxiliary compressor 1 compresses the 32.5% of the total $sCO_2$ mass flow rate from about 7.5 MPa and 80° C. to about 17 MPa and 155.5° C. (stream 3). Stream 3 is mixed with stream 2 to obtain stream 4. The 51.2% of the total $sCO_2$ mass flow rate goes to the cooler at about 7.5 MPa and 80° C. (stream 25).

Stream 25 is cooled in the cooler from about 80° C. to about 32° C. (stream 26). Stream 26 is compressed in the main compressor from about 32° C. and 7.5 MPa to about 76° C. and 17 MPa (stream 1).

This embodiment allows achieving increases up to 0.94 points with respect to the state-of-the-art water-steam regenerative Rankine cycle. Said FIG. 8 shows a preferred embodiment for the exploitation of a heat source at medium temperature. In this case, the cold outlet temperature of the heat source stream is fixed by the solar field. The selected turbine inlet pressure permits to work with the Heat Transfer Fluid entering the Heat Transfer Fluid Heat Exchanger at about 390° C. (stream $HS_1$) and leaving this exchanger at about 295° C. (stream $HS_2$).

Figure 10:
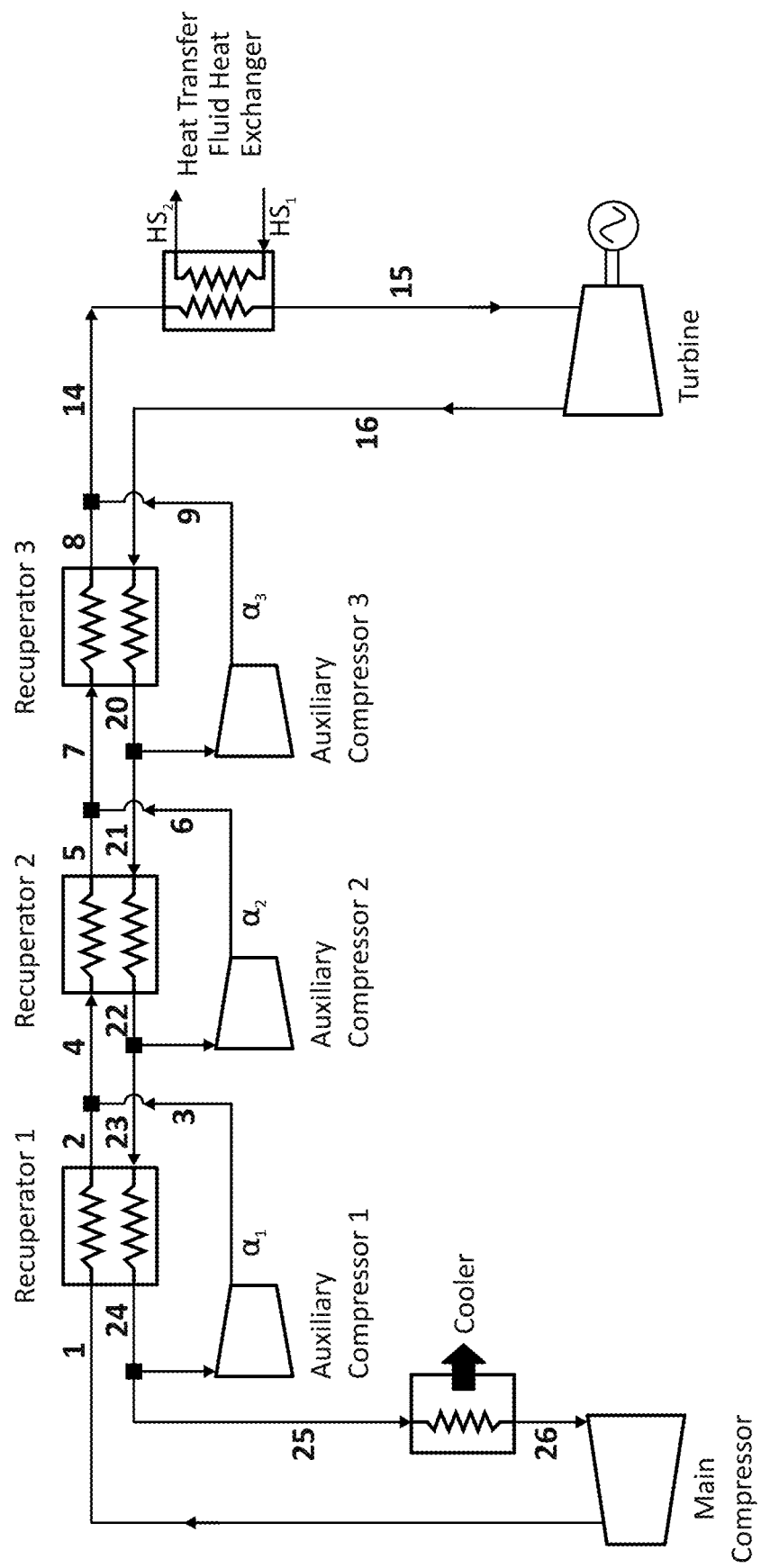
FIG. 10—EMBODIMENT 4, schematic diagram of the multiple recompression cycle with three recuperators and three auxiliary compressors.
Figure 11:
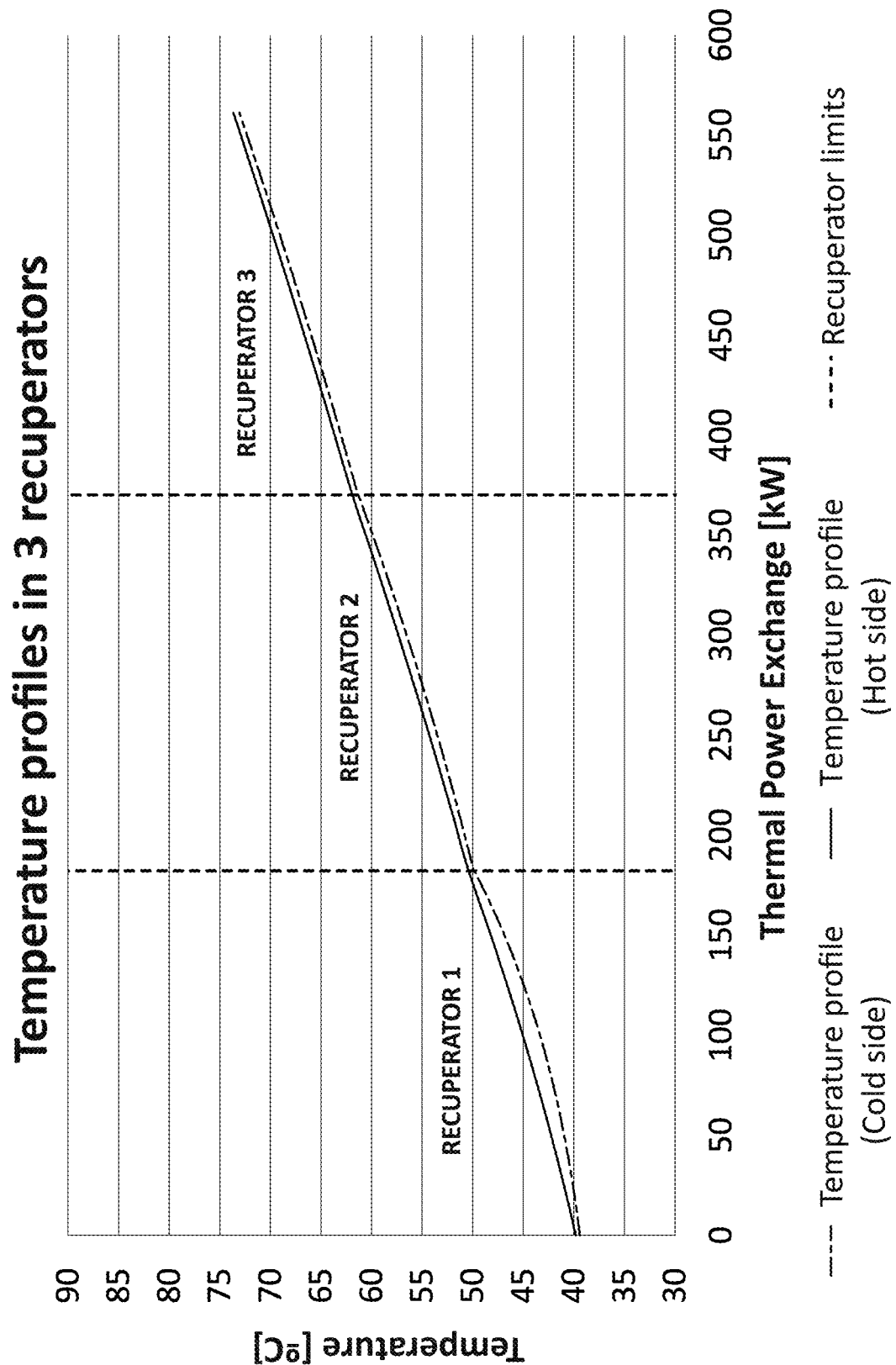
FIG. 11—Temperature—Thermal Power Exchange diagram of the heat recovery process within the three recuperators of the multiple recompression cycle for a low-temperature heat source.

Besides, according to a fourth preferred embodiment depicted in FIG. 10, there is a multiple recompression cycle using three recuperators and three auxiliary compressors. The cycle depicted in said FIG. 10 is a preferred embodiment of the invention for electric generation by means of a heat source available at low temperature.

In view of said FIG. 10, the low temperature heat source permits to heat up the $sCO_2$ stream leaving the recuperator 3 (stream 14) up to 85° C. at 8.6 MPa (stream 15). The stream 15 is expanded in the turbine to 73.7° C. and about 7.5 MPa (stream 16).

Stream 16 enters the hot side of recuperator 3 and is cooled down to 61.9° C. (stream 20) by means of heating stream 7 from 61.35° C. to 73.05° C. (stream 8). Auxiliary compressor 3 compresses the 15% of the total $sCO_2$ mass flow rate from about 7.5 MPa and 61.9° C. to about 8.6 MPa and 73.4° C. (stream 9). Stream 9 is mixed with stream 8 to obtain the stream 14 at 73.1° C. and 8.6 MPa. The 85% of the total $sCO_2$ mass flow rate goes to the hot side inlet of recuperator 2 at about 7.5 MPa and 61.9° C. (stream 21).

Stream 21 is then cooled down in the recuperator 2 to 50.4° C. (stream 22) by heating stream 4 from 49.9° C. to 61.3° C. (stream 5). Auxiliary compressor 2 compresses the 20.4% of the total $sCO_2$ mass flow rate from about 7.5 MPa and 50.4° C. to about 8.6 MPa and 61.5° C. (stream 6). Stream 6 is mixed with stream 5 to obtain stream 7. The 64.6% of the total $sCO_2$ mass flow rate goes to the hot side inlet of recuperator 1 at about 7.5 MPa and 50.4° C. (stream 23).

Stream 23 is then cooled down in the recuperator 1 to 39.8° C. (stream 24) by heating stream 1 from 39.4° C. to 49.8° C. (stream 2). Auxiliary compressor 1 compresses the 33.6% of the total $sCO_2$ mass flow rate from about 7.5 MPa and 39.8° C. to about 8.6 MPa and 50.0° C. (stream 3). Stream 3 is mixed with stream 2 to obtain the stream 4. The 31.0% of the total $sCO_2$ mass flow rate goes to the cooler at about 7.5 MPa and 39.8° C. (stream 25).

Stream 25 is cooled in the cooler from about 39.8° C. to about 32° C. (stream 26). Stream 26 is compressed in the main compressor from about 32° C. and 7.5 MPa to about 39.4° C. and 8.6 MPa (stream 1).

This embodiment allows achieving increases up to 2.1 points with respect to the state-of-the-art ORC cycles. Said FIG. 10 shows a preferred embodiment for the exploitation of a heat source at low temperature being the cold outlet temperature of the heat source stream (stream $HS_2$) fixed by the heat source stream cooling requirements. In this embodiment, the selection of 8.6 MPa as the turbine inlet pressure leads to a particular case where there are as many recuperators as auxiliary compressors.

Figure 12:
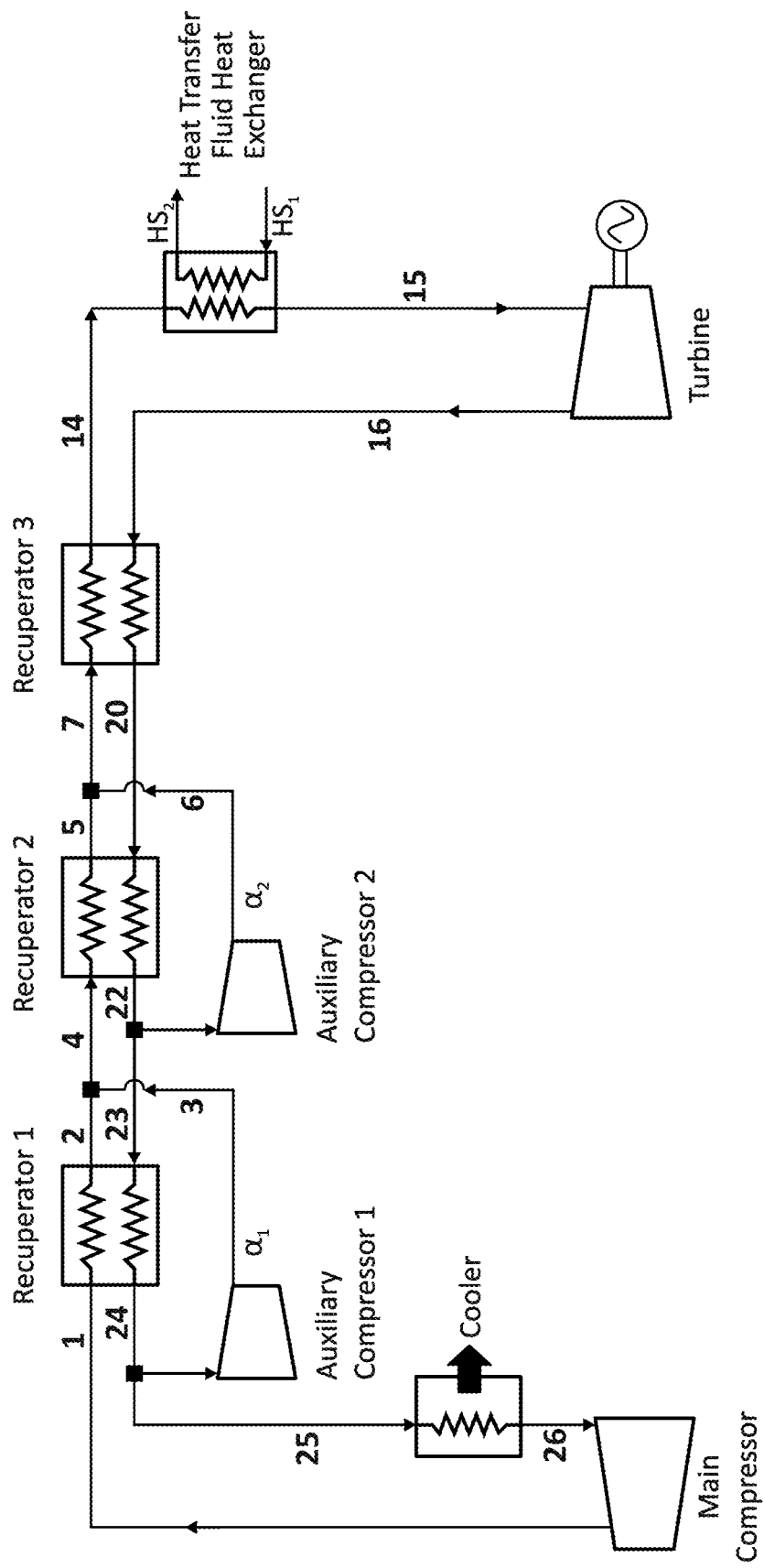
FIG. 12—EMBODIMENT 5, schematic diagram of the multiple recompression cycle with three recuperators.
Figure 13:
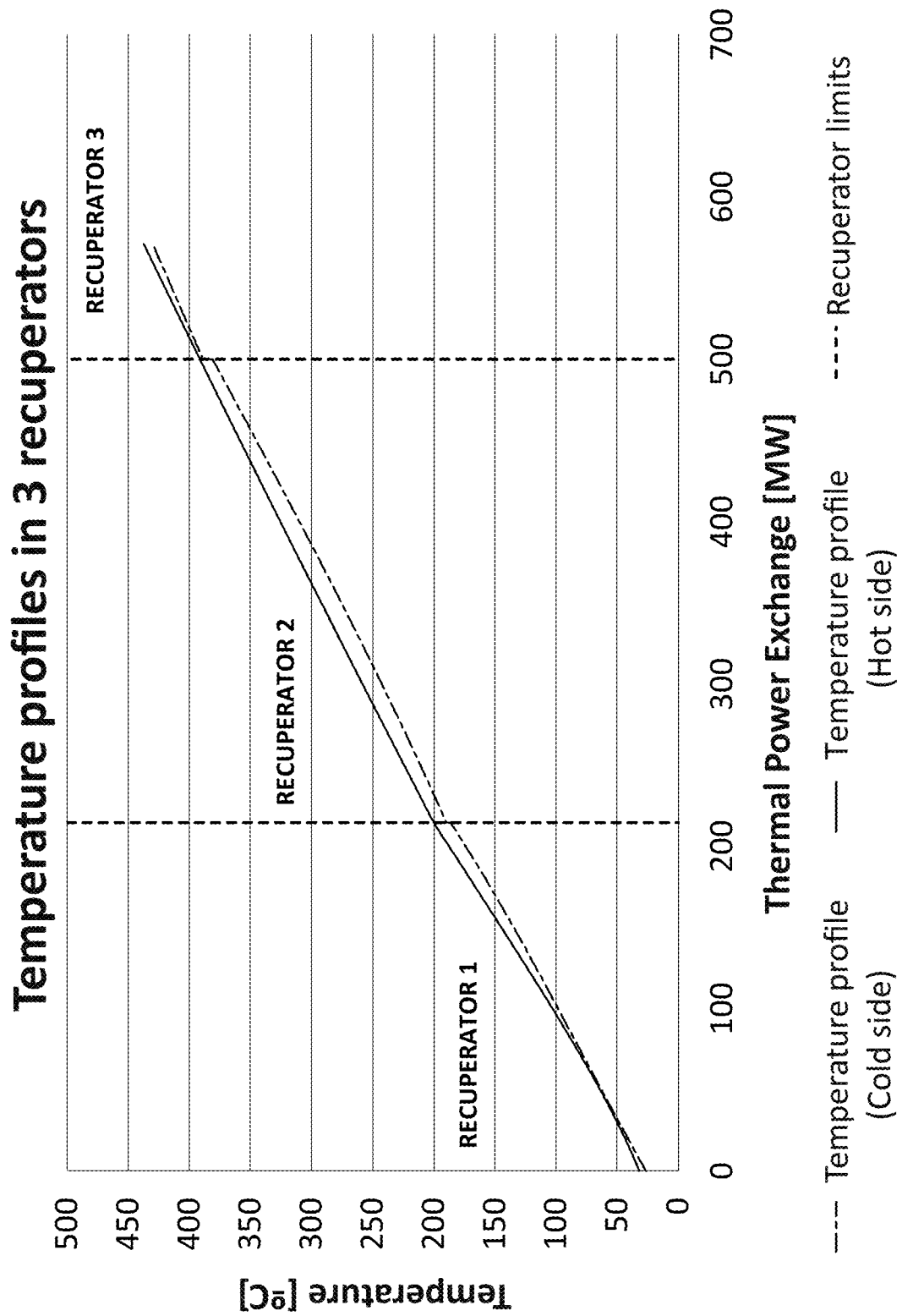
FIG. 13—Temperature—Thermal Power Exchange diagram of the heat recovery process within the three recuperators of the multiple recompression cycle for a high-temperature heat source and a cold sink that allows the CO2 to be cooled to temperatures below its critical temperature.

Finally, according to a fifth preferred embodiment, depicted in FIG. 12 there is a multiple recompression cycle using three recuperators and two auxiliary compressors. The cycle depicted in said FIG. 12 is a preferred embodiment of the invention for electric generation by means of a high-temperature heat source and a cold sink that allows the $CO_2$ to be cooled to temperatures below its critical temperature.

This configuration makes it possible to take advantage of hot sources in the form of mass flows or hot streams that must be cooled about 240° C. by expanding the $sCO_2$ from MPa to subcritical pressures of 5.3 MPa.

In view of said FIG. 12, the high temperature heat source permits to heat up the $sCO_2$ stream leaving the recuperator 3 (stream 14) up to 680° C. at 35 MPa (stream 15). The stream 15 is expanded in the turbine to 437° C. and about 5.3 MPa (stream 16).

Stream 16 enters the hot side of recuperator 3 and is cooled down to 391° C. (stream 20) by means of heating stream 7 from 389° C. to 430° C. (stream 14). Stream 20 is then cooled down in the recuperator 2 to 200° C. (stream 22) by heating stream 4 from 189° C. to 381° C. (stream 5). Auxiliary compressor 2 compresses the 20.3% of the total $sCO_2$ mass flow rate from about 5.3 MPa and 200° C. to about 35 MPa and 420° C. (stream 6). Stream 6 is mixed with stream 5 to obtain stream 7. The 79.7% of the total $sCO_2$ mass flow rate goes to the hot side inlet of recuperator 1 at about 5.3 MPa and 200° C. (stream 23).

Stream 23 is then cooled down in the recuperator 1 to 32° C. (stream 24) by heating stream 1 from 26.5° C. to 186° C. (stream 2). Auxiliary compressor 1 compresses the 25.6% of the total $sCO_2$ mass flow rate from about 5.3 MPa and 32° C. to about 35 MPa and 197.5° C. (stream 3). Stream 3 is mixed with stream 2 to obtain stream 4. The 54.1% of the total $sCO_2$ mass flow rate goes to the cooler at about 5.3 MPa and 32° C. (stream 25).

Stream 25 is cooled in the cooler from about 32° C. to about 5° C. (stream 26). Stream 26 is compressed in the main compressor from about 5° C. and 5.3 MPa to about 26.5° C. and 35 MPa (stream 1).

This embodiment allows achieving increases up to 1.2 points with respect to the state-of-the-art recompression cycle working with equipment with identical isentropic efficiencies and effectiveness. Said FIG. 12 shows a preferred embodiment for the exploitation of a heat source at high temperature and a cold sink that allows the CO2 to be cooled to temperatures below its critical temperature. In this case, the outlet temperature of the hot stream or thermal fluid that works as a heat source would be set at about 460° C. The selected turbine inlet pressure permits to work with the Heat Transfer Fluid entering the Heat Transfer Fluid Heat Exchanger at about 700° C. (stream $HS_1$) and leaving this exchanger at about 460° C. (stream $HS_2$).

The invention claimed is:
1. Method for producing energy by means of a supercritical carbon dioxide ($sCO_2$) regenerative Brayton cycle with N recuperators in series and N or N−1 auxiliary compressors, where N≥3, the method comprising a main compression process, and further:
   a. expanding a stream of supercritical $CO_2$ ($sCO_2$) in a turbine to a pressure between 3 MPa and 10 MPa to generate a sCO2 stream $RHI_N$, for generating some mechanical or electrical energy;
   b. cooling the $sCO_2$ stream $RHI_N$ in the N recuperators, this cooling step comprising the following steps c to e:
   c. cooling the $sCO_2$ stream $RHI_N$ to a stream $RHO_N$ by heating a stream $RCI_N$ to generate a stream $RCO_N$ in the recuperator number N, stream $RHI_{N-1}$ corresponds to the stream $RHO_N$;
   d. cooling the $sCO_2$ stream $RHI_{N-1}$ to generate a stream $RHO_{N-1}$ in recuperator number N−1 by heating a stream $RCI_{N-1}$ to generate a stream $RCO_{N-1}$, wherein the stream $RHO_{N-1}$ is split into two streams: a stream $RHI_{N-2}$ and a stream $ACI_{N-1}$, compressing the stream $ACI_{N-1}$ in an auxiliary compressor N−1 to the pressure of the stream $RCO_{N-1}$ thereby generating a stream $ACO_{N-1}$, mixing the stream $ACO_{N-1}$ with the stream $RCO_{N-1}$, thereby obtaining the mixture stream $RCI_N$, and sending the stream $RHI_{N-2}$ to the recuperator N−2;

e. If N>3, repeating step d) for the recuperators number N−2 to recuperator number 2;

f. cooling the $sCO_2$ stream $RHI_1$ to generate a stream $RHO_1$ in recuperator number 1 by heating a stream $RCI_1$ to generate a stream $RCO_1$, wherein the stream $RHO_1$ is split into two streams: a stream CI and a stream $ACI_1$, compressing the stream $ACI_1$ in an auxiliary compressor $_1$ to the pressure of the stream $RCO_1$ thereby generating a stream $ACO_1$, mixing the stream $ACO_1$ with the stream $RCO_1$, thereby obtaining the mixture stream $RCI_2$, and sending the stream CI to the cooler to generate a stream MCI, and sending the stream MCI to the main compression process, performing an intercooling stage within the main compression process, thereby generating the stream $RCI_1$ at the exit of the main compression process;

wherein N is calculated as i−1, for the value of i corresponding to the number of the iteration for which $T_{out,i} > T_{RHI_N}$−pinch$_i$ is fulfilled, considering in iteration i=1 $T_{in,1}$ is defined as the temperature of the main compression process inlet, $P_{in}$ and $P_{out}$ are defined as the main compression process inlet pressure and outlet pressure and $T_{out,1}$ is defined as the outlet temperature of main compression process, and by using following relations for iterations i>1:

$$h_{in,i} = f(T_{in,i}, P_{in}) \tag{1}$$

$$s_{in,i} = f(T_{in,i}, P_{in}) \tag{2}$$

$$h_{out,s,i} = f(P_{out}, s_{in,i}) \tag{3}$$

$$h_{out,i} = h_{in,i} + \frac{h_{out,s,i} - h_{in,i}}{\eta_{s,C,i-1}} \tag{4}$$

$$T_{out,i} = f(P_{out}, h_{out,i}) \tag{5}$$

and calculating $T_{in,i} = T_{out,i-1} + pinch_{i-1}$ at the beginning of each iteration for i>1, a number i of iterations until $T_{out,i} \geq T_{RHI_N}$−pinch$_i$ is fulfilled, where $T_{in,i}$ stands for the temperature of $(i-1)^{th}$ auxiliary compressor inlet, $h_{in,i}$ stands for the specific enthalpy of $(i-1)^{th}$ auxiliary compressor inlet, $s_{in,i}$ stands for the specific entropy of $(i-1)^{th}$ auxiliary compressor inlet, $h_{out,s,i}$ stands for the specific enthalpy of the outlet of the $(i-1)^{th}$ auxiliary compressor for an adiabatic and isentropic compression, $h_{out,i}$ stands for the specific enthalpy of stream leaving the $(i-1)^{th}$ auxiliary compressor and $T_{out,i}$ stands for the outlet temperature of $(i-1)^{th}$ auxiliary compressor, i being defined as the number of iterations, starting with i=1 for the main compression process and pinch$_i$ being defined as the minimum temperature difference between the cold stream and hot stream of the $i^{th}$ recuperator.

* * * * *